(12) United States Patent
Fu et al.

(10) Patent No.: US 12,468,485 B2
(45) Date of Patent: Nov. 11, 2025

(54) MEMORY SYSTEMS AND OPERATING METHODS THEREOF, ELECTRONIC SYSTEMS

(71) Applicant: YANGTZE MEMORY TECHNOLOGIES CO., LTD., Wuhan (CN)

(72) Inventors: Hai Fu, Wuhan (CN); Yuechun Kai, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 44 days.

(21) Appl. No.: 18/393,209

(22) Filed: Dec. 21, 2023

(65) Prior Publication Data

US 2025/0060904 A1    Feb. 20, 2025

(30) Foreign Application Priority Data

Aug. 14, 2023    (CN) .......................... 202311022164.X

(51) Int. Cl.
 *G06F 3/06*    (2006.01)
(52) U.S. Cl.
 CPC .......... *G06F 3/0659* (2013.01); *G06F 3/0604* (2013.01); *G06F 3/0679* (2013.01)
(58) Field of Classification Search
 CPC ....................................................... G06F 3/06
 See application file for complete search history.

(56) References Cited

U.S. PATENT DOCUMENTS

| | | | |
|---|---|---|---|
| 9,244,858 B1* | 1/2016 | Hu | G06F 12/1072 |
| 2016/0098201 A1* | 4/2016 | Kim | G06F 11/10 |
| | | | 711/103 |
| 2018/0136838 A1* | 5/2018 | White | G06F 3/0647 |
| 2021/0064293 A1* | 3/2021 | Cho | G06F 3/0673 |
| 2022/0004490 A1* | 1/2022 | Chen | G06F 12/0246 |
| 2023/0315320 A1* | 10/2023 | SeyedzadehDelcheh | ... |
| | | | G06F 3/0604 |
| | | | 711/154 |

\* cited by examiner

*Primary Examiner* — Khoa D Doan
(74) *Attorney, Agent, or Firm* — Conley Rose, P.C

(57) ABSTRACT

The present disclosure discloses example memory systems and operating methods thereof, and electronic systems. An example memory system includes a memory device and a controller coupled to the memory device. The controller is configured to receive a read command from a host, access a corresponding region of the memory device according to the read command, update hotness information of the corresponding region in a hotness table, determine one or more active regions based on the hotness information of regions in the hotness table, and send mapping information corresponding to the one or more active regions to the host. The hotness information includes a number of times a region is accessed by read commands from the host. The mapping information includes a mapping relationship table from logical address to physical address.

20 Claims, 10 Drawing Sheets

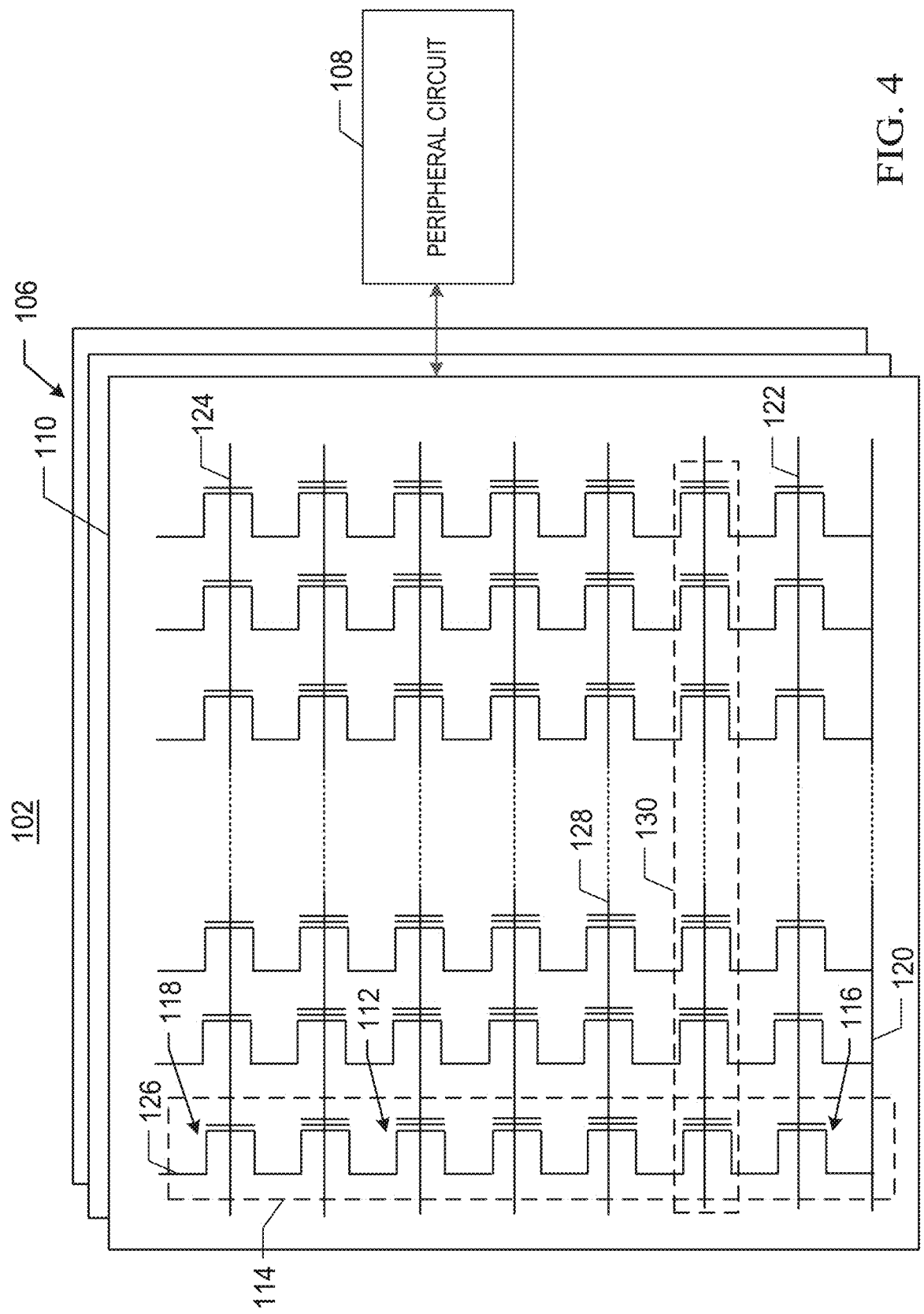

MEMORY SYSTEMS AND OPERATING METHODS THEREOF, ELECTRONIC SYSTEMS

CROSS-REFERENCE TO RELATED APPLICATIONS

The present application claims the benefit of priority to China Application No. 202311022164.X, filed on Aug. 14, 2023, the content of which is incorporated herein by reference in its entirety.

TECHNICAL FIELD

The present disclosure relates to the field of semiconductor technologies, and in examples to memory systems and operating methods thereof, systems and operating methods thereof, and readable storage mediums.

BACKGROUND

For Solid State Drive (SSD) products without Dynamic Random Access Memory (DRAM) cache (i.e., DRAM-less), a part of a Logical to Physical Table (L2P Table) may be stored in the Static Random Access Memory (SRAM) of a controller.

SUMMARY

Implementations of the present disclosure provide a memory system and an operating method thereof, a system and an operating method thereof, and a readable storage medium.

In a first aspect, a memory system is provided. The memory system includes a memory device and a controller coupled to the memory device. The controller is configured to: receive a read command from a host; access a corresponding region of a logical unit of the memory device according to the read command and update hotness information of the region in a hotness table, wherein the hotness information includes a number of times the region is accessed by read commands from the host; determine an active region among a plurality of the regions based on the hotness information of regions in the hotness table; and send mapping information corresponding to the active region to the host, wherein the mapping information includes a mapping relationship table from logical address to physical address.

In some implementations, the controller is configured to: if the region accessed by the read command is not in the hotness table, add the hotness information of the region accessed by the read command into the hotness table; and if the region accessed by the read command is already in the hotness table, modify the hotness information of the region accessed by the read command in the hotness table.

In some implementations, the controller is configured to: determine a region, which has been accessed by read commands from the host more than a preset number of times, as the active region based on the hotness information of regions in the hotness table.

In some implementations, the controller is further configured to delete the mapping information corresponding to the active region in the hotness table.

In some implementations, when a number of regions in the hotness table reaches a preset depth of the hotness table, the controller is configured to: determine N regions, which have been accessed by read commands from the host for the largest numbers of times, as the active regions according to numbers of times the regions are accessed by the read command from the host based on the hotness information of the regions in the hotness table, where N is a natural number greater than or equal to 1.

In some implementations, the controller is further configured to delete the mapping information corresponding to all regions in the hotness table.

In a second aspect, a system is provided. The system includes a host and a memory system coupled to the host, the memory system includes a memory device and a controller coupled to the memory device; the controller is configured to: receive a read command from a host; access a corresponding region of a logical unit of the memory device according to the read command and update hotness information of the region in a hotness table, wherein the hotness information includes a number of times the region is accessed by read commands from the host; determine an active region among a plurality of the regions based on the hotness information of regions in the hotness table; and send mapping information corresponding to the active region to the host, wherein the mapping information includes a mapping relationship table from logical address to physical address; and the host is configured to receive the mapping information corresponding to the active region.

In some implementations, the system may be an electronic system or an electronic device.

In some implementations, the host includes a host memory; the host memory is configured to store the mapping information corresponding to the active region; the host is configured to send the read command and the mapping information corresponding to the active region accessed by the read command; the controller is configured to: receive the read command, and read data from the memory device based on the mapping information corresponding to the active region accessed by the read command; and the memory device is configured to store the data corresponding to the read command.

In a third aspect, a method of operating a memory system is provided. The memory system includes a memory device and a controller coupled to the memory device. The method includes: receiving a read command from a host; accessing a corresponding region of a logical unit of the memory device according to the read command and updating hotness information of the region in a hotness table, wherein the hotness information includes a number of times the region is accessed by read commands from the host; determining an active region among a plurality of the regions based on the hotness information of regions in the hotness table; and sending mapping information corresponding to the active region to the host, wherein the mapping information includes a mapping relationship table from logical address to physical address.

In some implementations, the accessing a corresponding region of a logical unit of the memory device according to the read command and updating hotness information of the region in a hotness table include: if the region accessed by the read command is not in the hotness table, add the hotness information of the region accessed by the read command into the hotness table; and if the region accessed by the read command is already in the hotness table, modify the hotness information of the region accessed by the read command in the hotness table.

In some implementations, the determining an active region among a plurality of the regions based on the hotness information of regions in the hotness table includes: determining the region, which has been accessed by read commands from the host more than a preset number of times, as the active region based on the hotness information of regions in the hotness table.

In some implementations, the method further includes, after sending the mapping information corresponding to the active region to the host: deleting the mapping information corresponding to the active region in the hotness table.

In some implementations, when the number of the regions in the hotness table reaches a preset depth of the hotness table, the determining an active region among a plurality of the regions based on the hotness information of regions in the hotness table includes: determining N regions, which have been accessed by read commands from the host for the largest numbers of times, as the active regions according to numbers of times the regions are accessed by the read command from the host based on the hotness information of the regions in the hotness table, where N is a natural number greater than or equal to 1.

In some implementations, the method further includes, after sending the mapping information of the active region to the host in real time: deleting the mapping information corresponding to all regions in the hotness table.

In a fourth aspect, a method of operating a system is provided. The system includes a host and a memory system coupled to the host. The memory system includes a memory device and a controller coupled to the memory device. The method includes: by the controller, receiving a read command from a host; accessing a corresponding region of a logical unit of the memory device according to the read command and updating hotness information of the region in a hotness table, wherein the hotness information includes a number of times the region is accessed by read commands from the host; determining an active region among a plurality of the regions based on the hotness information of regions in the hotness table; and sending mapping information corresponding to the active region to the host, wherein the mapping information includes a mapping relationship table from logical address to physical address; and receiving, by the host, the mapping information corresponding to the active region.

In some implementations, the host includes a host memory; the method further includes, after the host receives the mapping information corresponding to the active region: storing, by the host memory, the mapping information corresponding to the active region; sending, by the host, the read command and the mapping information corresponding to the active region accessed by the read command; receiving, by the controller, the read command, and reading data from the memory device based on the mapping information corresponding to the active region accessed by the read command; and storing, by the memory device, the data corresponding to the read command.

In a fifth aspect, implementations of the present disclosure provide a readable storage medium that stores a computer program. When being executed, the computer program can implement the method comprising: receiving a read command from a host; accessing a corresponding region of a logical unit of the memory device according to the read command and updating hotness information of the region in a hotness table, wherein the hotness information includes a number of times the region is accessed by read commands from the host; determining an active region among a plurality of the regions based on the hotness information of regions in the hotness table; and sending mapping information corresponding to the active region to the host, wherein the mapping information includes a mapping relationship table from logical address to physical address.

BRIEF DESCRIPTION OF THE DRAWINGS

FIG. 4 is a schematic diagram of a memory device including a memory cell array according to some implementations of the present disclosure.

DETAILED DESCRIPTION

Figure 1:
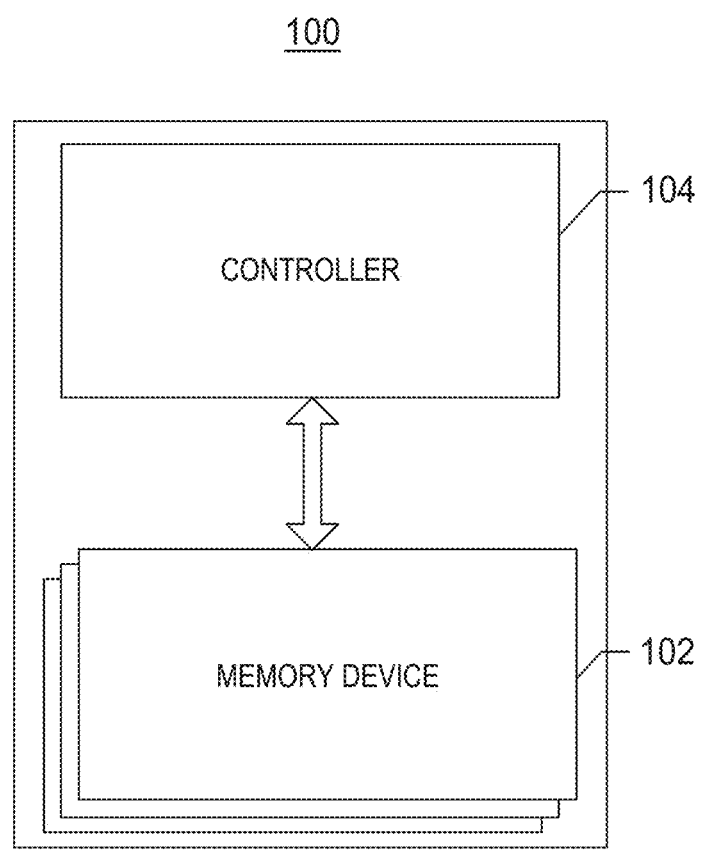
FIG. 1 is a schematic diagram of a memory system according to some implementations of the present disclosure.

The technical solutions in the implementations of the present disclosure will be clearly and completely described below with reference to the implementations of the present disclosure and the accompanying drawings. Obviously, the described implementations are only some of the implementations of the present disclosure, not all of them. Based on the implementations in this disclosure, all other implementations obtained by those of ordinary skill in the art without creative efforts fall within the scope of protection of the present disclosure.

In the following description, numerous specific details are given in order to provide a more thorough understanding of the present disclosure. It will be apparent, however, to one skilled in the art that the present disclosure may be practiced without one or more of these details. In other instances, some technical features known in the art are not described to avoid confusion with the present disclosure; that is, not all features of the actual implementation are described here, and well-known functions and structures are not described in detail.

In the drawings, the size of layers, regions, elements and their relative sizes may be exaggerated for clarity. Like reference numerals refer to like elements throughout.

The terminology used herein is for the purpose of describing implementations only and is not to be taken as a limitation of the present disclosure. As used herein, the singular forms "a", "an" and "said/the" are intended to include the plural forms as well, unless the context clearly dictates otherwise. It should also be understood that the terms "comprised of" and/or "comprise", when used in this specification, identify the presence of stated features, integers, steps, operations, elements and/or parts, but do not exclude presence or addition of one or more other features, integers, steps, operations, elements, parts and/or groups. As used herein, the term "and/or" includes any and all combinations of the associated listed items.

To gain a thorough understanding of the present disclosure, detailed steps and detailed structures will be provided in the following description to explain the technical solutions of the present disclosure. Preferred implementations of the present disclosure are described in detail below. However, in addition to these detailed descriptions, the present disclosure may be otherwise implemented.

Referring to FIG. 1, a schematic diagram of a memory system according to some implementations of the present disclosure is shown. As shown in FIG. 1, the memory system 100 includes at least one memory device 102 and a controller 104 coupled to the memory device 102 and configured to control the memory device 102.

In some implementations, the controller 104 is designed to operate in a low duty-cycle environment, such as Secure Digital (SD) cards, Compact Flash (CF) cards, Universal Serial Bus (USB) flash drive, or other media used in electronic devices such as personal computers, digital cameras, mobile phones, etc.

In some implementations, the controller 104 is designed to operate in a high duty-cycle environment SSD or embedded Multi-Media Card (eMMC) used as data storage in mobile devices (such as smartphones, tablet computers, and laptops) and enterprise storage arrays.

The controller 104 may be configured to control operations of the memory device 102, such as read, erase, and program operations. The controller 104 may be further configured to manage various functions with respect to data stored or to be stored in the memory device 102, including, but not limited to, bad block management, garbage collection, logical to physical address translation, wear leveling, and the like. In some implementations, the controller 104 is further configured to process error correcting codes (ECC) regarding data read from or written to the memory device 102.

The controller 104 may also perform any other suitable functions, such as formatting memory device 102. Controller 104 may communicate with external devices (e.g., host) according to a communication protocol. For example, the controller 104 can communicate with external devices through at least one of various interface protocols, such as USB protocol, MMC protocol, Peripheral Component Interconnect (PCI) protocol, PCI Express (PCI-E) protocol, Advanced Technology Attachment (ATA) protocol, Serial ATA protocol, Parallel ATA protocol, Small Computer Small Interface (SCSI) protocol, Enhanced Small Drive Interface (ESDI) protocol, Integrated Drive Electronics (IDE) protocol, Firewire protocol, etc.

The controller 104 and one or more memory devices 102 may be integrated into various types of storage devices, for example, included in the same package (e.g., a Universal Flash storage (UFS) package or an eMMC package). That is, the memory system 100 may be implemented and packaged into different types of end electronic products.

Figure 2:
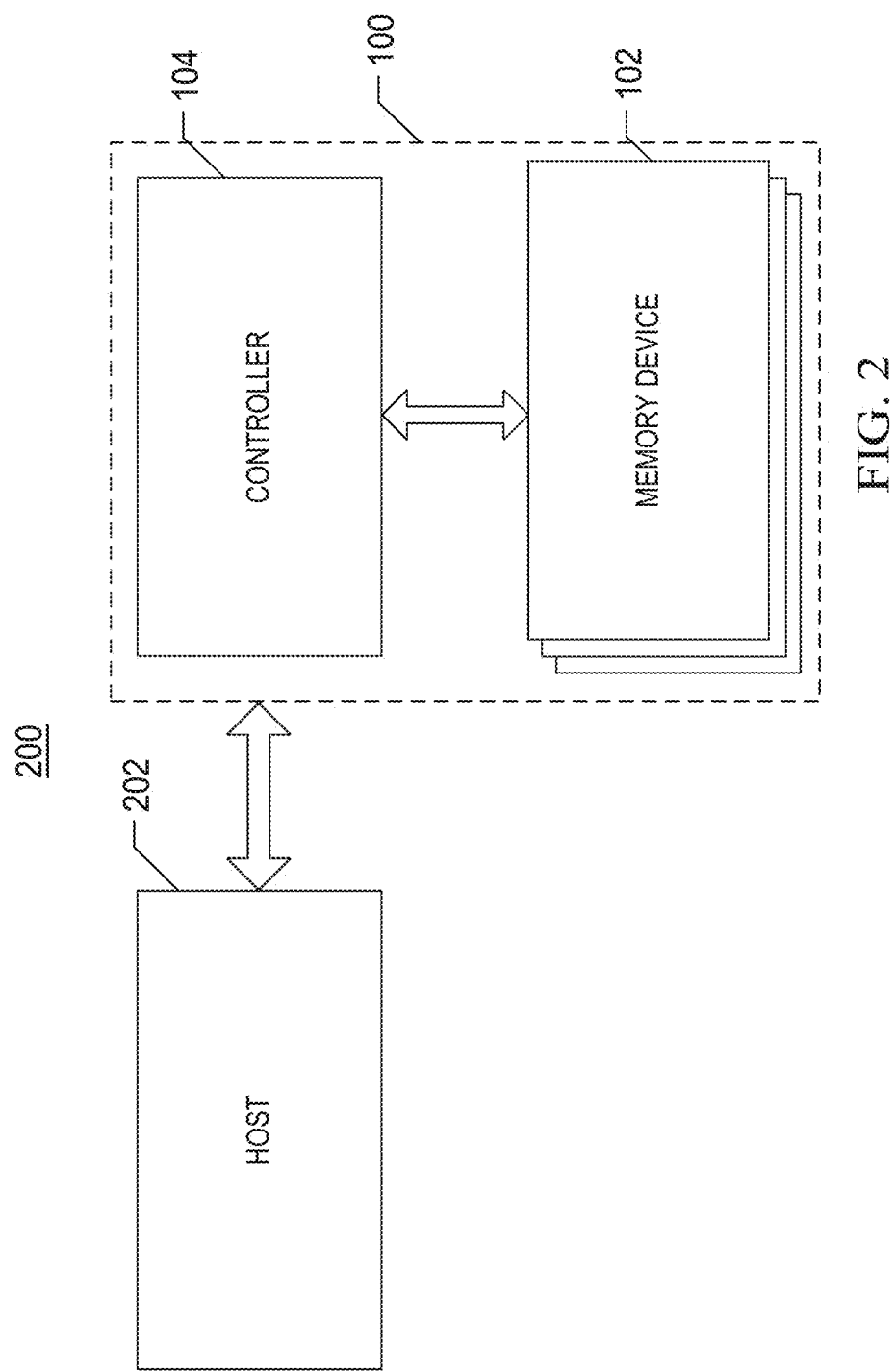
FIG. 2 is a schematic diagram of a system according to some implementations of the present disclosure.

Referring to FIG. 2, a schematic diagram of a system according to some implementations of the present disclosure is shown. As shown in FIG. 2, a system 200 includes a host 202 and a memory system 100. The memory system 100 has one or more memory devices 102 and a controller 104.

In some implementations, the system 200 may be a mobile phone, desktop computer, laptop computer, tablet computer, vehicle computer, game console, printer, pointing device, wearable electronic device, smart sensor, virtual reality (VR) device, augmented reality (AR) device, or any other suitable electronic devices having a memory device therein.

As shown in FIG. 2, the host 202 may be a processor of the electronic device (for example, a Central Processing Unit (CPU) or a System on Chip (SoC) (for example, an Application Processor (AP)). The host 202 may be configured to send data to or receive data from the memory device 102.

In some implementations, the controller 104 is coupled to the memory device 102 and the host 202, and is configured to control the memory device 102. The controller 104 can manage data stored in the memory device 102 and communicate with the host 202.

Figure 3B:
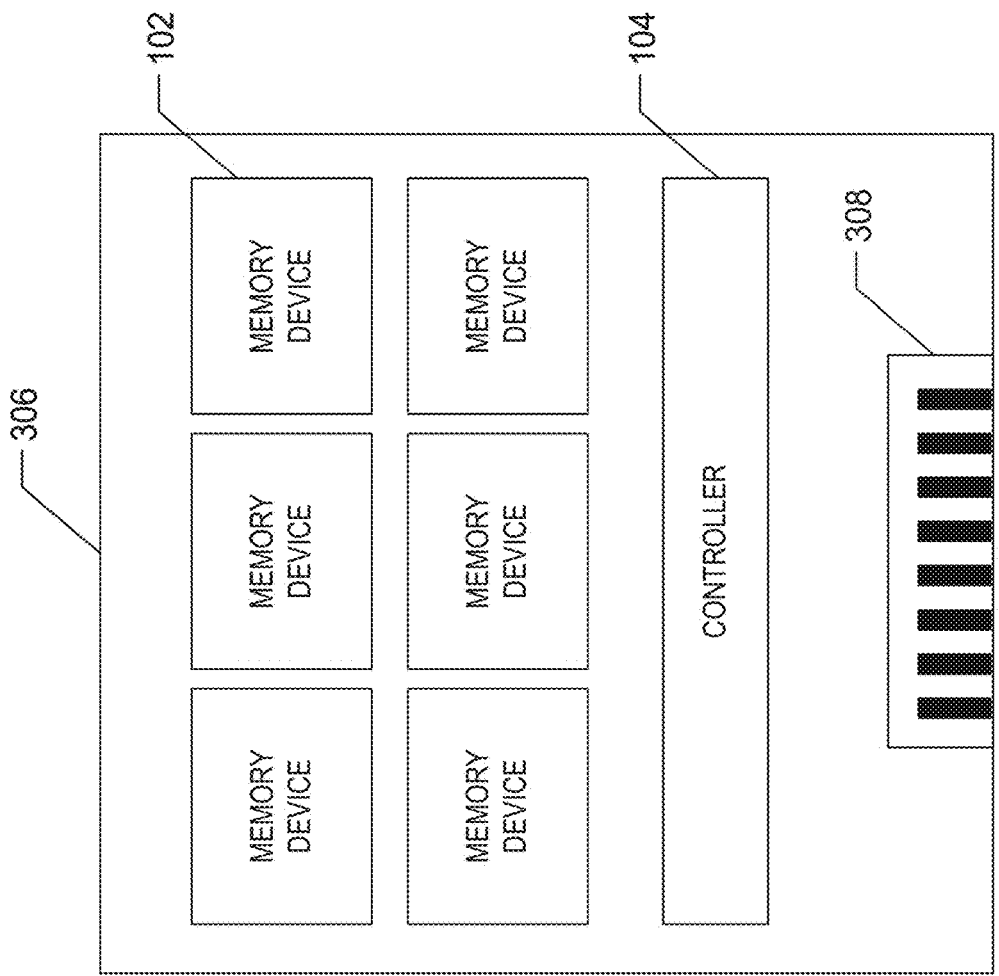
FIG. 3B is a schematic diagram of a solid state drive with a memory device according to some implementations of the present disclosure.
Figure 3A:
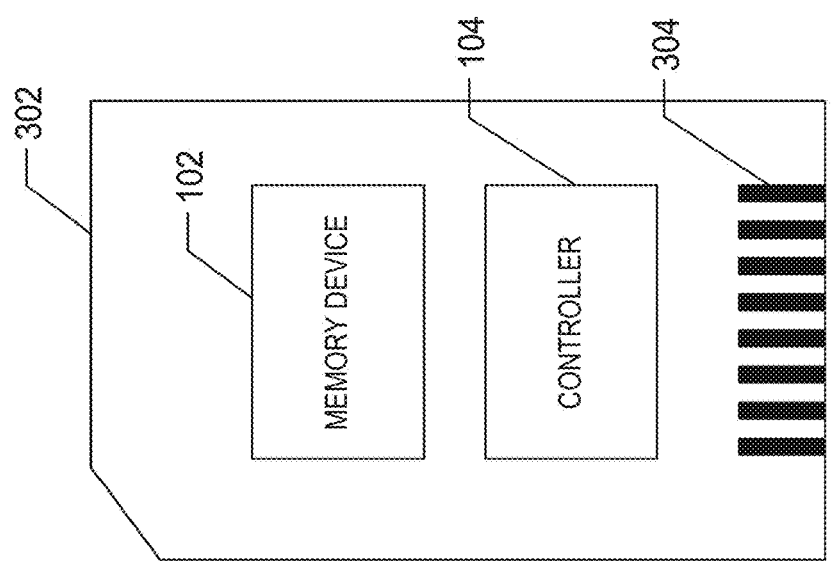
FIG. 3A is a schematic diagram of a memory card with a memory device according to some implementations of the present disclosure.

Referring to FIG. 3A, a schematic diagram of a memory card provided with a memory device according to some implementations of the present disclosure is shown. As shown in FIG. 3A, the controller 104 and a single memory device 102 may be integrated into a memory card 302. The memory card 302 may include a Personal Computer Memory Card International Association (PCMCIA) card, a CF card, a Smart Media (SM) card, a memory stick, a multimedia card (e.g., MMC, Reduced-Size MMC (RS-MMC), MMCmicro), SD (e.g., SD, miniSD, microSD, Secure Digital High Capacity (SDHC)) cards, UFS, etc. Memory card 302 may also include a memory card connector 304 that couples memory card 302 to a host (e.g., host 202 in FIG. 2).

Referring to FIG. 3B, a schematic diagram of a solid state drive with a memory device according to some implementations of the present disclosure is shown. As shown in FIG. 3B, the controller 104 and a plurality of memory devices 102 may be integrated into the solid state drive 306. Solid state drive 306 may also include a solid state drive connector 308 that couples solid state drive 306 to a host (e.g., host 202 in FIG. 2). In some implementations, the storage capacity and/or operating speed of the solid state drive 306 is greater than the storage capacity and/or operating speed of the memory card 302.

Referring to FIG. 4, a schematic diagram of a memory device including a memory cell array according to some implementations of the present disclosure is shown. As shown in FIG. 4, the memory device 102 may include memory cell array 106 and a peripheral circuit 108 coupled to the memory cell array 106. The memory cell array 106 may be a NAND flash memory cell array, where memory cells 112 are provided as an array of memory strings 114, each memory string 114 extending vertically over a substrate (not shown in FIG. 4). In some implementations, each memory string 114 includes a plurality of memory cells 112 coupled in series and vertically stacked. Each memory cell 112 may hold a continuous analog value, such as voltage or charge, that depends on the number of electrons trapped within the area of the memory cell 112. Each memory cell 112 may be a floating-gate type memory cell including a floating gate transistor, or a charge-trap type memory cell including a charge trap transistor.

In some implementations, each memory cell 112 may be a Single-Level Cell (SLC) that has two possible memory states and thus can store one bit of data. For example, the SLC may have a first memory state "1" and a second memory state "0", where the threshold voltage distribution of the first memory state "1" may correspond to a first voltage range, and the threshold voltage distribution of the second memory state "0" may correspond to a second voltage range. The first memory state is an erased state, and the second memory state is a programmed state. In some implementations, each memory cell 112 is a Multi-Level Cell (MLC) capable of storing more than a single bit of data in more than four memory states. For example, an MLC can store two bits of data per cell, three bits of data per cell (also known as a Triple-Level Cell (TLC)), or four bits of data per cell (also known as a Quad-Level Cell (QLC)). Each MLC can be programmed to assume a voltage range of possible threshold voltage distributions. In one example, if each MLC stores two bits of data, the MLC may have a first memory state "11", a second memory state "10", a third memory state "01", and a fourth memory state "00", Here, the threshold voltage distributions of the first, second, third and fourth memory states respectively correspond to the first, second, third and fourth voltage ranges. Among them, the first memory state is an erased state, and the second, third and fourth memory states are all programmed states. Similarly. TLC may have 8 memory states, including an erased state and 7 programmed states, and QLC may have 16 memory states, including an erased state and 15 programmed states.

As shown in FIG. 4, each memory string 114 may include a source selective transistor (SST) 116 at its source terminal and a drain selective transistor (DST) 118 at its drain terminal. Source selective transistor 116 and drain selective transistor 118 may be configured to activate selected memory string 114 (a column of the array) during read and program operations. In some implementations, the sources of the memory strings 114 in the same block 110 are coupled via the same source line (SL) 120 (e.g., a common SL). In other words, in some implementations, all memory strings 114 in the same block 110 have an array common source (ACS). In some implementations, the drain of the drain selective transistor 118 of each memory string 114 is coupled to a corresponding bit line (BL) 126, which enables reading or writing data from the bit line 126 via an output bus (not shown in FIG. 4). In some implementations, each memory string 114 is configured to be selected or deselected by applying to corresponding drain selective transistor 118 a select voltage (e.g., higher than a threshold voltage of drain selective transistor 118) or a deselection voltage (for example, 0V) via one or more drain selective line (DSL) 124, and/or, by applying to corresponding source selective transistor 116 a select voltage (e.g., higher than a threshold voltage of source selective transistor 116) or a deselection voltage (for example, 0V) via one or more source selective line (SSL) 122.

As shown in FIG. 4, memory string 114 may be organized into a plurality of memory blocks 110, each of which may have a source line 120 (e.g., common SL coupled to ground). In some implementations, each block 110 is the basic unit for an erase operation. That is, all memory cells 112 on the same block 110 are erased simultaneously. To erase the memory cells 112 in a selected block, an erase voltage Vers (e.g., a high positive voltage (e.g., 20V or higher)) is bias coupled to source lines 120 of the selected block and to unselected memory blocks in the same plane as the selected block. It should be understood that, in some examples, erase operations may be performed at the half block level, at the quarter block level, or at any suitable number of blocks or any fraction of blocks. Memory cells 112 of adjacent memory strings 114 may be coupled by word lines 128 that select which row of memory cells 112 is affected by read and program operations. In some implementations, each word line 128 is coupled to a page 130 of memory cells 112. Each word line 128 may include a plurality of control gates (gate electrodes) at each memory cell 112 in a corresponding page 130 and a gate line coupling the control gates.

It should be noted that the page shown in FIG. 4 is a physical page, which refers to a layer of memory cells at the physical level. The basic data unit for program operations and read operations is a logical page. For SLC, each memory cell can store 1 bit of information, so that the information stored in a layer of memory cells at the physical level (i.e., one physical page) corresponds to the information of one logical page. For MLC, each memory cell can store 2 bits of information, so that the information stored in a layer of memory cells at the physical level (i.e., one physical page) corresponds to information of two logical pages. For TLC, each memory cell can store 3 bits of information, so that the information stored in a layer of memory cells at the physical level (i.e., one physical page) corresponds to information of three logical pages. For QLC, each memory cell can store 4 bits of information, so that the information stored in a layer of memory cells at the physical level (i.e., one physical page) corresponds to information of four logical pages.

Figure 5:
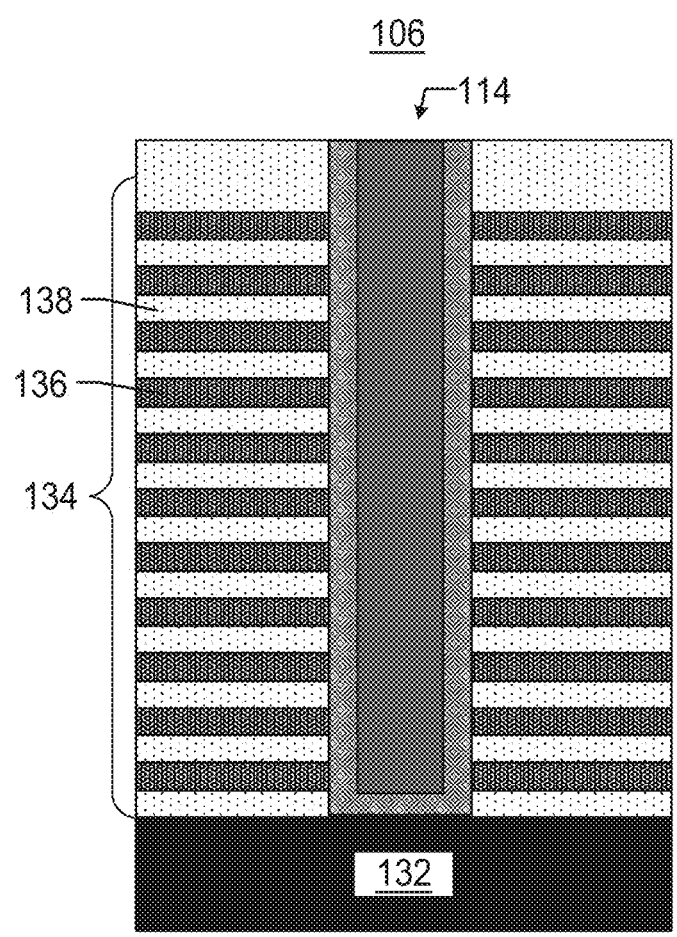
FIG. 5 is a schematic cross-sectional view of a memory cell array including memory strings according to some implementations of the present disclosure.

Referring to FIG. 5, a schematic cross-sectional view of a memory cell array including a memory string according to some implementations of the present disclosure is shown. As shown in FIG. 5, the memory string 114 may extend vertically through the memory stack layer 134 above semiconductor layer 132. The semiconductor layer 132 may include silicon (e.g., monocrystalline silicon), silicon germanium (SiGe), gallium arsenide (GaAs), germanium (Ge), silicon-on-insulator (SOI), Ge-On-Insulator (GOI) or any other suitable material.

Memory stack layer 134 may include alternating gate conductive layers 136 and gate dielectric layers 138. The number of memory cells 112 in memory cell array 106 may be determined by the number of pairs of gate conductive layer 136 and gate dielectric layer 138 in memory stack layer 134. The gate conductive layer 136 may include a conductive material including, but not limited to, tungsten (W), cobalt (Co), copper (Cu), aluminum (Al), polysilicon, doped silicon, silicide, or any combination thereof. In some implementations, each gate conductive layer 136 includes a metal layer, such as a tungsten layer. In some implementations, each gate conductive layer 136 includes a doped polysilicon layer. Each gate conductive layer 136 may include a control gate surrounding the memory cell 112 and may extend laterally at the top of the memory stack layer 134 as a drain selective line 124 and extend laterally at the bottom of the memory stack layer 134 as a source selective line 122, or extend laterally as a word line 128 between drain selective line 124 and source selective line 122.

As shown in FIG. 4, memory string 114 includes a channel structure extending vertically through memory stack layer 134. In some implementations, the channel structure includes a channel hole filled with semiconductor material(s) (e.g., as a semiconductor channel) and dielectric material(s) (e.g., as a memory film). In some implementations, the semiconductor channel includes silicon, e.g., polysilicon. In some implementations, the memory film is a composite dielectric layer including a tunneling layer, a storage layer (also referred to as a "charge trap/storage layer"), and a barrier layer. The channel structure may have a cylindrical shape (e.g., a pillar shape). According to some implementations, the semiconductor channel, the tunneling layer, the storage layer and the barrier layer are radially arranged in this order from the center of the pillar toward the outer surface of the pillar. The tunneling layer may include silicon oxide, silicon oxynitride, or any combination thereof. The storage layer may include silicon nitride, silicon oxynitride, or any combination thereof. The barrier layer may include silicon oxide, silicon oxynitride, a high dielectric constant (high-k) dielectric, or any combination thereof. In one example, the memory film may include a composite layer of silicon oxide/silicon oxynitride/silicon oxide (ONO).

According to some implementations, a well (e.g., a P-well and/or an N-well) may be formed in the semiconductor layer 132 and a source terminal of the memory string 114 is in contact with the well. For example, the source line may be coupled to the well to apply an erase voltage to the well (i.e., the source of the memory string) during an erase operation. In some implementations, the memory string further includes a channel plug at a drain terminal of memory string 114. It should be understood that, although not illustrated in FIG. 5, additional components of the memory cell array 106 may be formed, including but not limited to gate line gaps/source contacts, local contacts, interconnect layers, and the like.

Referring back to FIG. 4, the peripheral circuit 108 may be coupled to the memory cell array 106 via the bit line 126, the word line 128, the source line 120, the source selective line 122, and the drain selective line 124. A peripheral circuit 108 may include any suitable analog, digital, and mixed-signal circuit for applying voltage signals and/or current signals data to each target memory cell 112 via bit lines 126, word lines 128, source lines 120, source selective line 122, and drain selective line 124 and sensing voltage signals and/or current signals data from each target memory cell 112 to facilitate operation of the memory cell array 106. The peripheral circuit 108 may include various types of peripheral circuits formed using Metal Oxide Semiconductor (MOS) technology.

Figure 6:
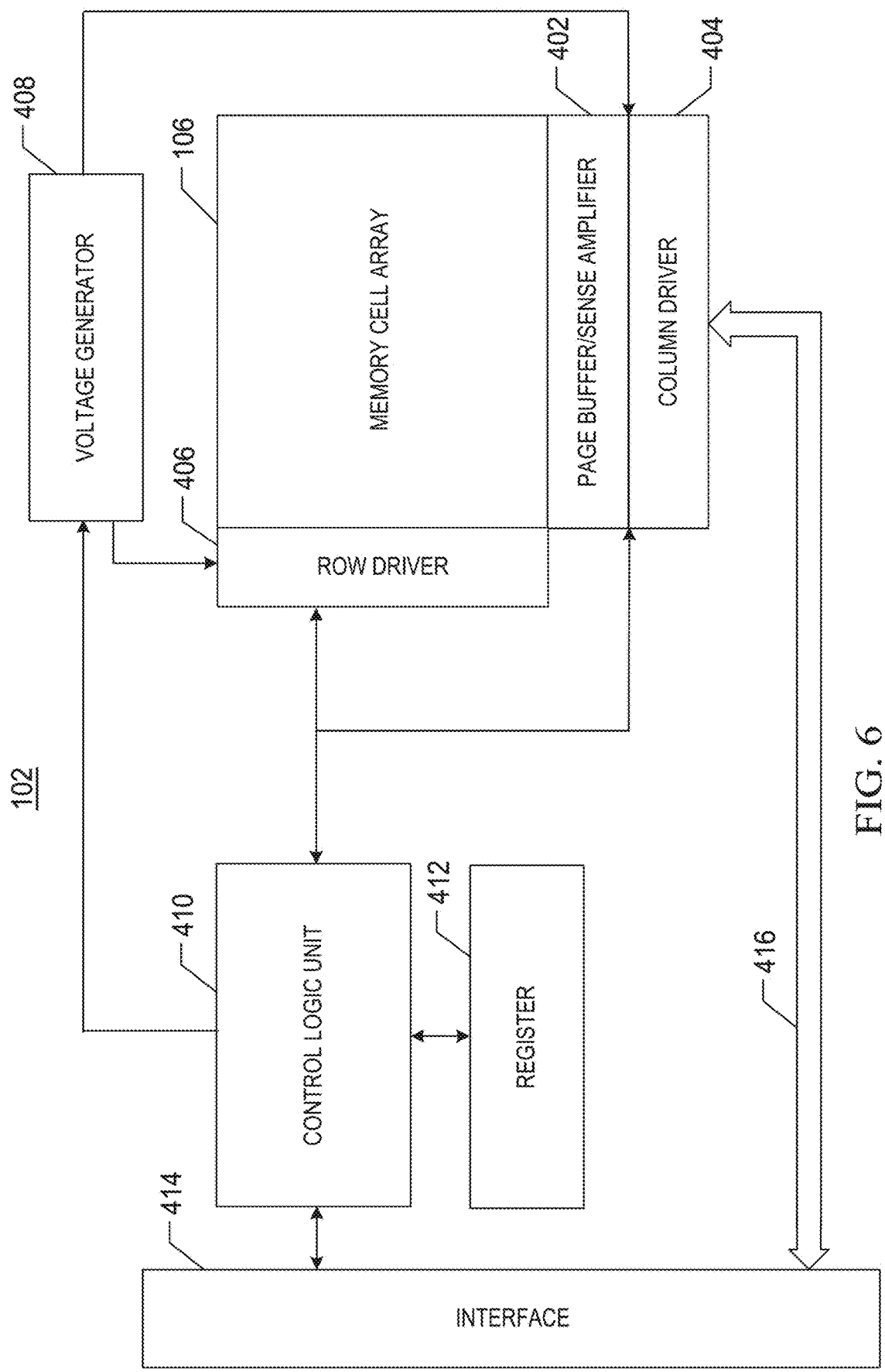
FIG. 6 is a schematic diagram of a memory device including a memory cell array and peripheral circuits according to some implementations of the present disclosure.

Referring to FIG. 6, a schematic diagram of a memory device including a memory cell array and peripheral circuits according to some implementations of the present disclosure is shown. As shown in FIG. 6, the peripheral circuit includes a page buffer/sense amplifier 402, a column driver 404, a row driver 406, a voltage generator 408, a control logic unit 410, a register 412, an interface (I/F) 414 and data bus 416. It should be understood that in some examples, additional peripheral circuits not shown in FIG. 6 may also be included.

Page buffer/sense amplifier 402 may be configured to read data from and program (write) data to memory cell array 106 according to control signals from a control logic unit 410. In one example, page buffer/sense amplifier 402 may store a page of program data (write data) to be programmed into one page 130 of memory cell array 106. In another example, page buffer/sense amplifier 402 may perform a program verify operation to ensure that data has been correctly programmed into the memory cell 112 coupled to the selected word line 128. In yet another example, page buffer/sense amplifier 402 may further sense a low power signal from bit line 126 representing a data bit stored in memory cell 112 and amplify the small voltage swing to a recognizable logic level during a read operation. A column driver 404 may be configured to be controlled by control logic unit 410 and to select one or more memory strings 114 by applying bit line voltages generated from voltage generator 408.

A row driver 406 may be configured to be controlled by the control logic unit 410 and select/deselect a block 110 of memory cell array 106 and select/deselect word lines 128 of a block 110. The row driver 406 may also be configured to drive word line 128 using the word line voltage generated from voltage generator 408. In some implementations, the row driver 406 may also select/deselect and drive source selective line 122 and drain selective line 124. As described in detail below, the row driver 406 is configured to perform an erase operation on memory cells 112 coupled to selected word line(s) 128. A voltage generator 408 may be configured to be controlled by the control logic unit 410 and generate word line voltages (e.g., read voltages, program voltages, pass voltages, local voltages, verify voltages, etc.), bit line voltages and source line voltages to be supplied to the memory cell array 106.

The control logic unit 410 may be coupled to each of the peripheral circuits described above and configured to control the operation of each peripheral circuit. A register 412 may be coupled to the control logic unit 410 and includes a status register, a command register, and an address register for storing status information, command operation codes (OP codes), and command addresses for controlling the operation of each peripheral circuit. An interface 414 may be coupled to the control logic unit 410 and act as a control buffer to buffer and relay control commands received from a host (not shown in FIG. 6) to the control logic unit 410, as well as to buffer and relay status information received from the control logic unit 410 to the host. The interface 414 may also be coupled to the column driver 404 via a data bus 416 and acts as a data Input/Output (I/O) interface and data buffer to buffer and relay data to or from the memory cell array 106.

Currently, for DRAM-less SSD products, a part of the mapping relationship table is stored in the SRAM of the controller. However, the cache space of the controller's SRAM is limited and can only store a small number of mapping relationship tables. The remaining mapping relationship tables still need to be stored in the memory device. In this way, each time a read command is executed, the mapping relationship table stored in the controller may be searched, or even the mapping relationship table stored in the memory device may be searched, thereby affecting the performance of the controller and reducing the read speed.

Figure 7:
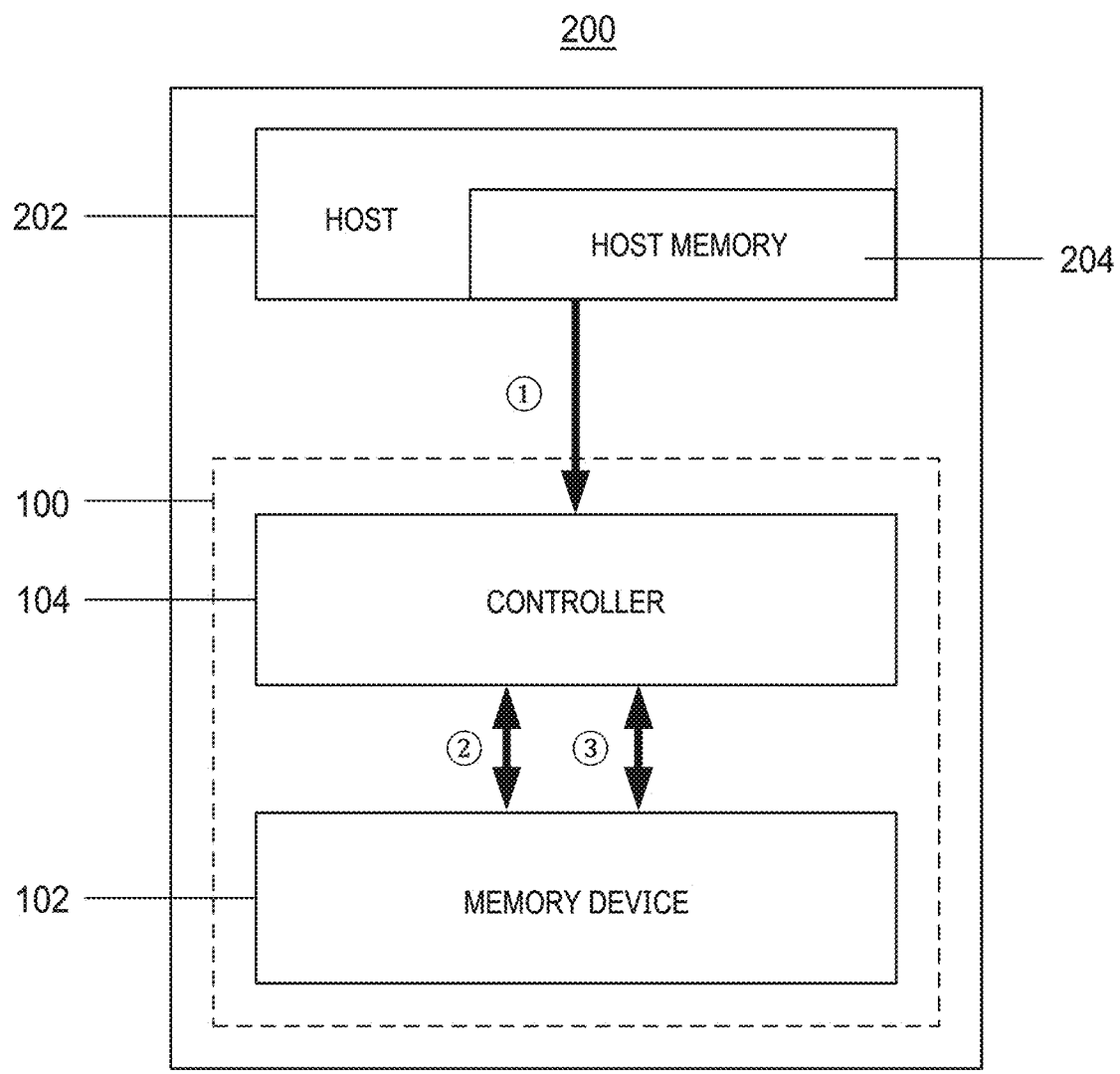
FIG. 7 is a schematic flowchart of executing a read command according to some implementations of the present disclosure.

Referring to FIG. 7, a schematic flowchart of executing a read command according to some implementations of the present disclosure is shown. As shown in FIG. 7, the system 200 may include: a host 202. The host 202 includes a host memory 204 and a memory system 100 coupled to the host 202 (shown as a dotted box in FIG. 7). The memory system 100 includes a memory device 102 and controller 104 that is coupled to memory device 102 and configured to control memory device 102.

As shown in ① in FIG. 7, the host 202 can send a read command to the memory system 100. As shown in ② in FIG. 7, when the mapping relationship table corresponding to the region accessed by a read command sent from the host 202 is not saved in the controller 104, the mapping relationship table should be read from the memory device 102. As shown in ③ in FIG. 7, the controller 104 reads data from the memory device 102 according to the mapping relationship table.

In some implementations, the memory system 100 in the system 200 can be, for example, UFS. In this case, a part of the mapping relationship table can be saved in the host memory 204 of the host 202 by using a Host Performance Booster (HPB) in the system 200. During sending of the read command by the host 202, the host 202 may send the read command and the mapping relationship table corresponding to the region accessed by the read command to the memory system 100, thereby improving data reading efficiency.

In some implementations, the memory system 100 in the system 200 may be, for example, an SSD. In this case, the system 200 may use a Host Memory Buffer (HMB) to save a part of the mapping relationship table in the host memory 204 of the host 202. The implementations of the present disclosure have no special restrictions on the type of the memory system, and have no special restrictions on the use of a host performance enhancer or a host memory buffer in the system, as long as it is possible to functionally enabling storing a part of the mapping relationship in the host memory of the host.

However, due to the complexity of data reading scenarios, it is difficult to accurately identify the mapping relationship table corresponding to which regions are stored in the host memory to effectively improve data reading efficiency.

In view of this, implementations of the present disclosure provide a memory system and operating method thereof, a system and operating method thereof, and a readable storage medium.

Figure 8:
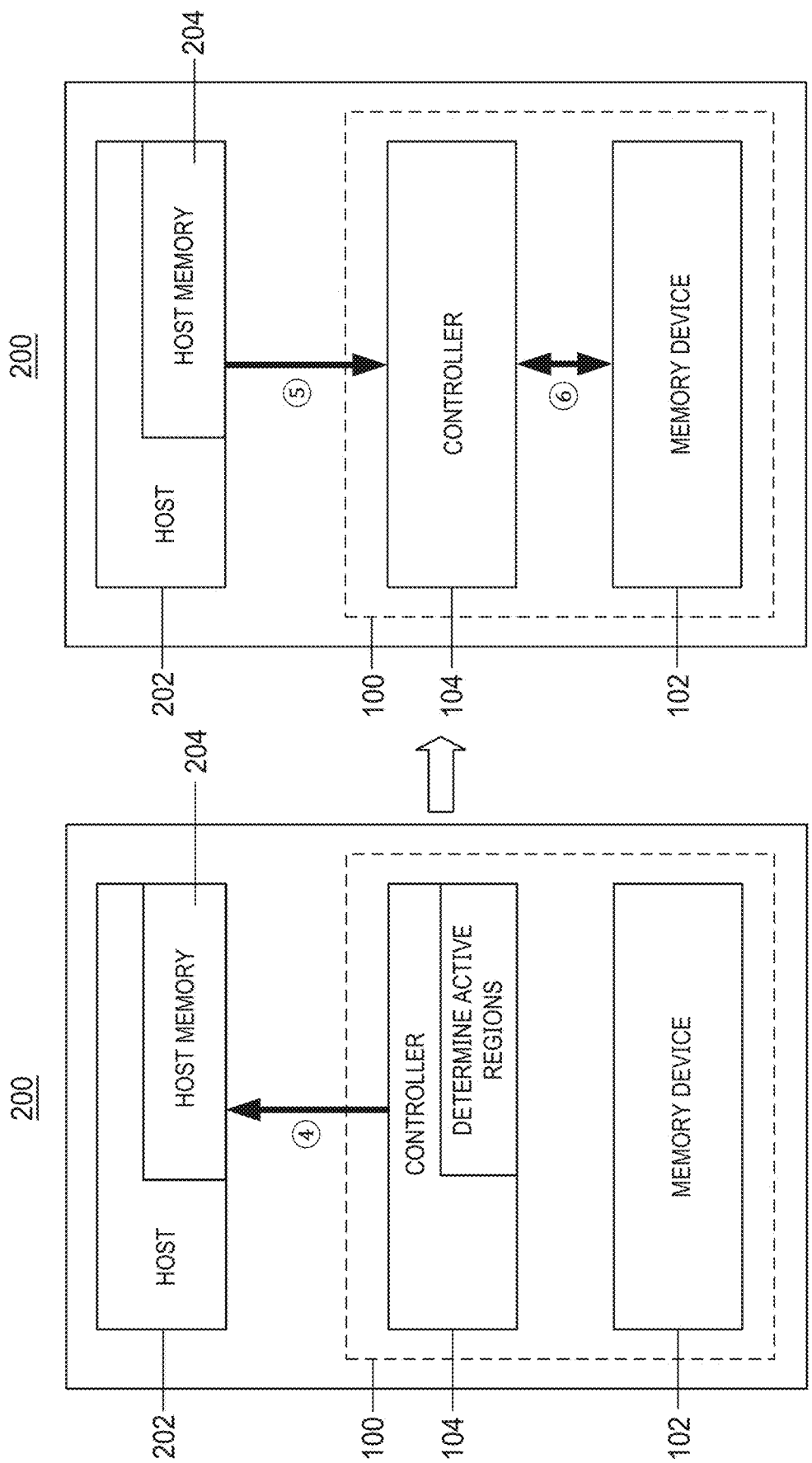
FIG. 8 is a schematic diagram of a system according to an implementation of the present disclosure.

Refer to FIG. 8, a schematic diagram of a system according to an implementation of the present disclosure is shown. As shown in FIG. 8, an implementation of the present disclosure provides a memory system 100. The memory system 100 includes a memory device 102 and a controller 104 coupled to the memory device 102. The controller 104 is configured to receive a read command from a host 202; access a corresponding region of a logical unit of the memory device 102 or a corresponding region of the memory device 102 according to the read command; and update hotness information of the region (e.g., the corresponding region) in a hotness table. The hotness information includes a number of times a region of the memory device is accessed by read commands from the host. The controller 104 is further configured to: determine an active region or more active regions among a plurality of regions of the memory device 102 based on the hotness information of regions in the hotness table; and send mapping information corresponding to the active region or the more active regions to the host 202. The mapping information includes a mapping relationship table or a mapping relationship from logical address to physical address.

In some implementations, the chip or the memory device may include multiple logical units (LUNs), each logical unit may include multiple planes, each plane may include multiple blocks, and each block may include multiple pages. The logical unit is the basic unit for receiving and executing commands.

In some implementations, the memory system can manage data by regions, and one logical unit can form multiple regions. During execution of the read command, the mapping relationship table of a region accessed by the read command shall be obtained to obtain its physical address. In this way, the data is read from the memory device according to the physical address.

In an implementation of the present disclosure, the hotness information of the regions in the hotness table can be updated in real time or at regular intervals, according to the region accessed each time when the read command from the host is executed. That is, the number of times the regions are accessed by the read commands from the host can be updated in the hotness table in real time or at regular intervals. In other words, the hotness information in the hotness table changes dynamically, and a read command is executed, the hotness information in the hotness table may be updated.

In an implementation of the present disclosure, an active region or more active regions can be determined among multiple regions according to the hotness information of the regions in the hotness table, and the mapping information corresponding to the active region can be sent to the host. That is to say, after identifying the active region among multiple regions, the controller can send the mapping information corresponding to the active region to the host. In this way, the mapping information corresponding to the regions stored in the host is the mapping information corresponding to the regions that have been accessed more frequently by recently-executed read commands. By updating the hotness information of the regions in the hotness table in real time or at regular intervals, and by sending the mapping information corresponding to active regions to the host in real time or at regular intervals, the probability of obtaining, on the host side, the mapping information corresponding to regions accessed by read commands from the host can be improved, thereby improving the data reading efficiency.

Figure 9:
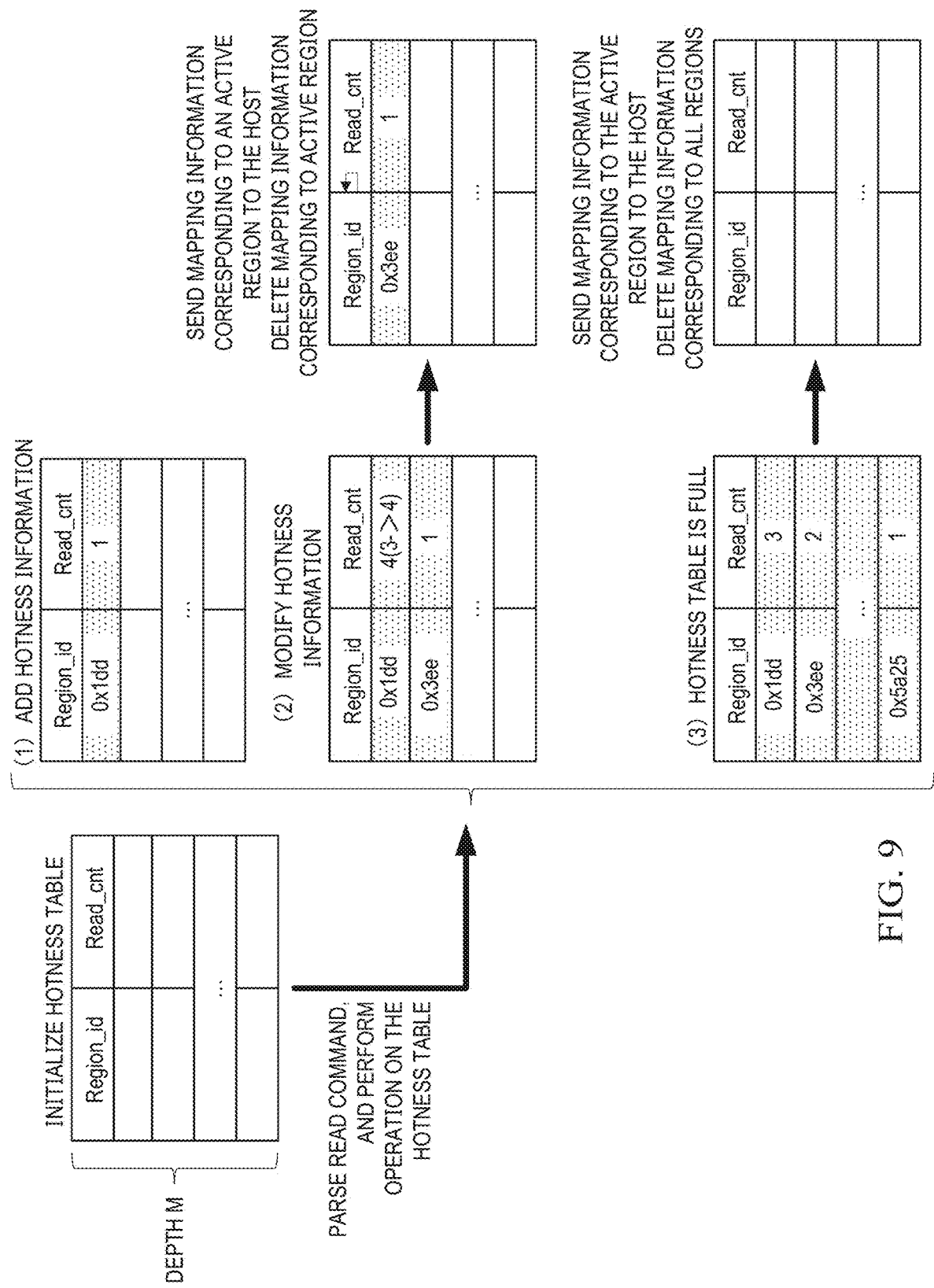
FIG. 9 is a schematic flowchart of determining an active region according to an implementation of the present disclosure.

Referring to FIG. 9, a schematic flowchart of determining an active region according to an implementation of the present disclosure is shown. The following will describe in detail how to update the hotness information in the hotness table and how to determine the active region among multiple regions with reference to FIG. 9.

As shown in FIG. 9, a hotness table with a preset depth of M (for example, M is 256) is initialized. Each record in the hotness table includes the management number (Region_id) of the region and the number of times (Read_cnt) the region has been accessed by the read command from the host. The number of times the region is accessed by the read command from the host can also be called the number of hits of the region. In an implementation of the present disclosure, it is required to monitor regions accessed by each read command, and record the number of times the regions are accessed by the read command from the host in the "hotness table".

The implementations of the present disclosure have no special restrictions on the preset depth of the hotness table, which can be flexibly selected according to actual conditions to meet more application scenarios.

In some implementations, the controller 104 is configured to: in response to the corresponding region accessed by the read command is not in the hotness table, add the corresponding region and the hotness information of the corresponding region accessed by the read command into the hotness table; and in response to the corresponding region accessed by the read command is already in the hotness table, modify the hotness information of the corresponding region accessed by the read command in the hotness table.

As shown in FIG. 9, in response to the corresponding region accessed by the read command is not in the hotness table, that is, if there is no hotness information for the corresponding region in the hotness table, a new record is added in the hotness table to record the management number of the corresponding region and the number of times this region is accessed by the read command from the host is set to 1. If the corresponding region accessed by the read command is already in the hotness table, that is, if the hotness information of the corresponding region already exists in the hotness table, the hotness information in the hotness table is modified, to increase by 1 the number of times the corresponding region is accessed by the read command from the host.

In some implementations, the controller 104 is configured to determine, according to the hotness information of regions in the hotness table, a region that has been accessed by the read command from the host 202 more than (lager than) a preset number of times as an active region.

In some implementations, the controller 104 is further configured to delete the mapping information corresponding to active regions in the hotness table.

As shown in FIG. 9, if a region is accessed by read commands from the host more than the preset number of times (for example: the preset number of times is 4), the region is determined to be the active region, the mapping information corresponding to the active region will sent to the host, and the mapping information corresponding to the active region in the hotness table is deleted, that is, deleting the hotness information record from the hotness table.

In an implementation of the present disclosure, an active region refers to a region that has recently been accessed more frequently by the read command from the host. The controller sends the mapping information corresponding to the active region to the host, thereby improving the probability of obtaining the mapping information corresponding to regions accessed by read commands from the host on the host side, that is, improving the hit rate that the active region is accessed by the read command from the host.

The implementations of the present disclosure have no special limitation on the number of preset times, which can be flexibly selected according to the actual situation, thereby satisfying more application scenarios.

In some implementations, when the number of the regions in the hotness table reaches a preset depth of the hotness table, the controller 104 is configured to determine N regions, which have been accessed by read commands from the host for the largest numbers of times, as the active regions according to numbers of times the regions are accessed by the read command from the host based on the hotness information of the regions in the hotness table, where N is a natural number greater than or equal to 1. In some implementations, in response to a number of regions in the hotness table reaches a preset depth of the hotness table, the controller is configured to determine, as N active regions, N regions in descending order of the number of times regions accessed by read commands from the host, according to the hotness information of regions in the hotness table.

In some implementations, the controller is further configured to delete mapping information corresponding to all regions in the hotness table.

As shown in FIG. 9, the number of regions in the hotness table reaches the preset depth of the hotness table, that is, the hotness table is full. In this case, the N (for example, 4) regions that have been accessed for the largest numbers of times by the read command from the host can all be determined as active regions, the mapping information corresponding to the active regions can be sent to the host, and the mapping information corresponding to all regions in the hotness table can be deleted, that is, clearing all hotness information records in the hotness table.

For example, all the regions in the hotness table can be sorted by the number of times they are accessed by read commands from the host. When all the regions are arranged in an ascending order according to the number of times they are accessed by the read command from the host, the N regions from the bottom of the sorting are determined as the active regions. When all the regions are arranged in a descending order according to the number of times they are accessed by the read command from the host, the N regions from the top of the sorting can be determined as the active regions. Of course, it is possible that the regions in the hotness table are not sorted, and the N regions that have been accessed by the read command from the host for the largest numbers of times are directly determined as the active regions.

The implementations of the present disclosure have no special limitations on the specific value of N, which can be flexibly selected according to the actual situation, thereby meeting more application scenarios.

An implementation of the present disclosure provides a system (e.g., an electronic system). The system 200 includes a host 202 and a memory system 100 coupled to the host 202. The host 202 is configured to send read commands to the memory system 100. The memory system 100 includes a memory device 102 and a controller 104 coupled to the memory device 102. The controller 104 is configured to: receive a read command from the host 202; access a corresponding region of a logical unit of the memory device or a corresponding region of the memory device according to the read command; update the hotness information of the corresponding region in the hotness table. The hotness information includes the number of times a region of the memory device accessed by the read command from the host. The controller 104 is further configured to: determine an active region or more active regions among multiple regions of the memory device according to the hotness information of the regions in the hotness table and send the mapping information corresponding to the active region to the host 202. The mapping information includes a mapping relationship table or mapping relationship from logical address to physical address. The host 202 is further configured to receive mapping information corresponding to the active region. The system 200 illustrated in FIG. 8 may also be called an electronic device or an electronic system.

As shown in ④ in FIG. 8, the controller 104 identifies the active region and can send the mapping information corresponding to the active region to the host 202, and the mapping information corresponding to the active region can be stored in the host memory 204.

In some implementations, the host 202 includes a host memory 204. The host memory 204 is configured to store mapping information corresponding to the active region. The host 202 is configured to send a read command and the mapping information corresponding to the active region accessed by the read command. The controller 104 is configured to receive a read command, and read data from the memory device 102 according to the mapping information corresponding to the active region accessed by the read command. The memory device 102 is configured to store the data corresponding to the read command.

In an implementation of the present disclosure, the controller can determine the active region among multiple regions, and send the mapping information corresponding to the active region to the host in real time or at regular intervals. When sending a read command, the host can obtain the mapping information corresponding to the active region accessed by the read command from the host memory, and send the read command and the mapping information corresponding to the active region accessed by the read command to the memory system. The controller in the memory system receives the read command, obtains the physical address based on the mapping information corresponding to the active region accessed by the read command, and reads data from the memory device based on the physical address.

As shown in ⑤ in FIG. 8, the host 202 can send a read command and the mapping information corresponding to the active region accessed by the read command to the memory system 100. As shown in ⑥ in FIG. 8, the controller 104 obtains its physical address according to the mapping information corresponding to the active region accessed by the read command, and read the data directly from the memory device 102.

In an implementation of the present disclosure, a hotness table is set in the controller to record the number of hits of the region where the read data is located, and a region whose number of hits in the hotness table is greater than the preset number is determined as the active region. Alternatively, when the hotness table is full, the N regions with the largest numbers of hits are determined as active regions, and the controller recommends the mapping information corresponding to the active regions to the host.

In an implementation of the present disclosure, the hit rates of read commands from the host to access the active regions can be improved, the time consumption of reading data can be reduced, and the data reading performance can be improved. In addition, compared with storing the mapping information of the region in the SRAM of the controller, the cost of the controller can be saved.

Figure 10:
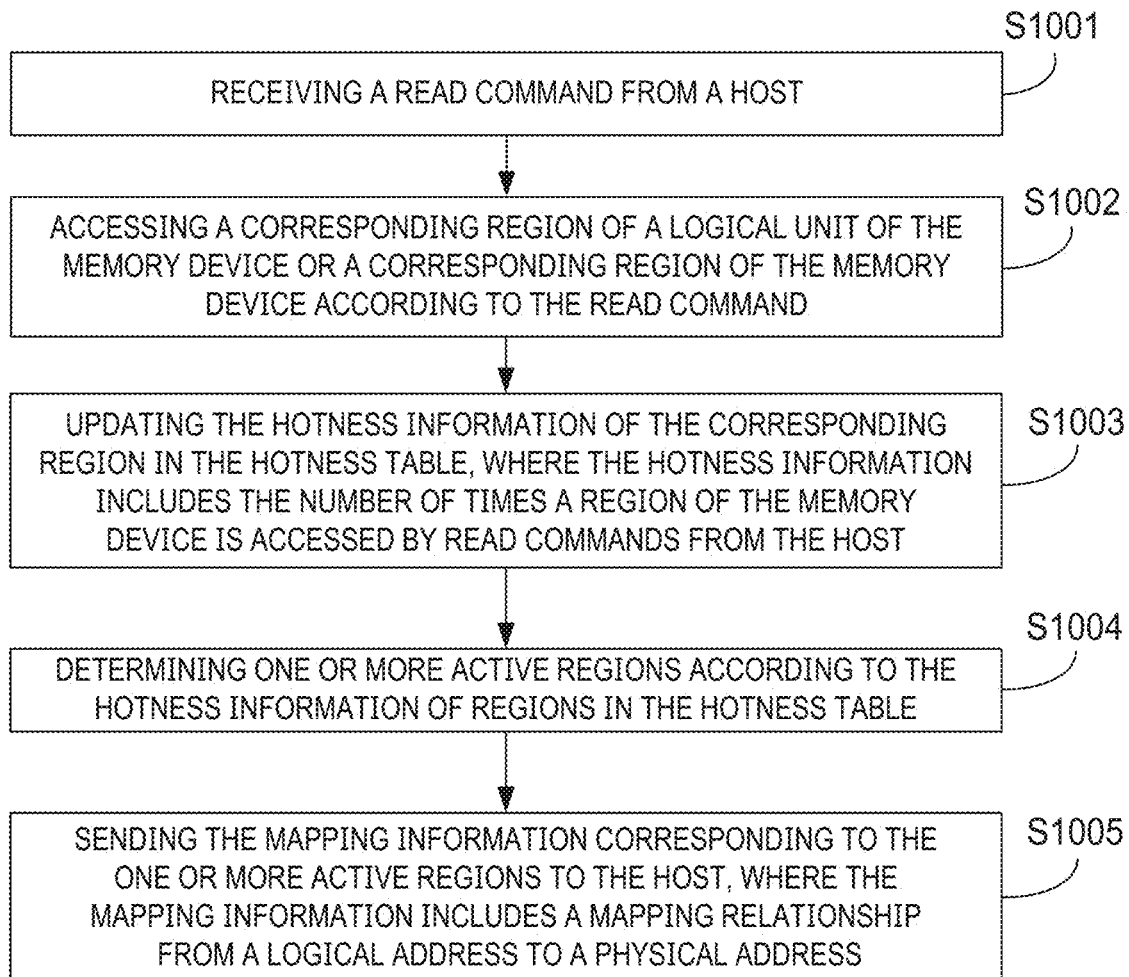
FIG. 10 is a flowchart of a method of operating a memory system according to an implementation of the present disclosure.

Referring to FIG. 10, a flow chart of a method of operating a memory system according to an implementation of the present disclosure is shown. As shown in FIG. 10, an implementation of the present disclosure provides a method of operating a memory system. The memory system 100 includes a memory device 102 and a controller 104 coupled to the memory device 102. The method includes: operation S1001: receiving a read command from a host; operation S1002: accessing a corresponding region of a logical unit of the memory device or a corresponding region of the memory device according to the read command; operation S1003: updating the hotness information of the corresponding region in the hotness table, where the hotness information includes the number of times a region of the memory device is accessed by the read command from the host; operation S1004: determining an active region or more active regions according to the hotness information of the regions in the hotness table; and operation S1005: sending the mapping information corresponding to the active region or the more active regions to the host, where the mapping information includes a mapping relationship table or a mapping relationship from logical address to physical address.

In an implementation of the present disclosure, in operation S1001, the memory system 100 (e.g., controller 104) receives a read command from the host 202.

In an implementation of the present disclosure, in operation S1002, the memory system 100 (e.g., controller 104) accesses a corresponding region of the logical unit of the memory device 102 according to the read command.

In an implementation of the present disclosure, in operation S1003, the memory system 100 (e.g., controller 104) updates the hotness information of the corresponding region in the hotness table. The hotness information includes the number of times a region of the memory device 102 is accessed by the read command from the host 202.

The memory system here can update the hotness information of regions in the hotness table in real time or at regular intervals based on the regions accessed by the read command. If the corresponding region accessed by the read command is already in the hotness table, the number of times the region is accessed by the read command from the host in the hotness table may be modified. If the corresponding region accessed by the read command does not exist in the hotness table, the corresponding region accessed by the read command is added into the hotness table and the number of times the corresponding region is accessed by read commands from the host is recorded.

In some implementations, the controller 104 in the memory system 100 updates the hotness table in real time or at regular intervals, that is, records the management number of the region accessed by each read command and the number of times the region is accessed by the read command from the host.

In an implementation of the present disclosure, in operation S1004, an active region or more active regions is determined from multiple regions according to the hotness information of the regions in the hotness table.

Here, the controller 104 within the memory system 100 determines the active region among the plurality of regions. For example, according to the hotness information of the regions in the hotness table, a region that has been accessed by read commands from the host more than the preset number of times can be determined as an active region. Alternatively, when the hotness table is full, the N regions with the largest numbers of accesses by the read command from the host are determined as active regions, according to numbers of times the regions are accessed by the read command from the host based on the hotness information of the regions in the hotness table.

In an implementation of the present disclosure, in operation S1005, the mapping information corresponding to the active region is sent to the host. The mapping information includes a mapping relationship table from logical address to physical address.

Here, after the controller 104 in the memory system 100 determines the active region among multiple regions, the controller 104 may send the mapping information corresponding to the active region to the host 202 in real time or more active regions. In other words, after identifying the active region among multiple regions, the controller 104 may send the mapping information corresponding to the active region to the host.

In some implementations, operation S1002 may include if the region accessed by the read command is not in the hotness table, adding the hotness information of the region accessed by the read command into the hotness table. Operation S1002 may further include if the region accessed by the read command is already in the hotness table, modifying the hotness information of the region accessed by the read command in the hotness table.

In some implementations, operation S1004 includes determining the region, which has been accessed by read commands from the host more than a preset number of times, as the active region based on the hotness information of regions in the hotness table.

In some implementations, after the operation S1005, the method further includes deleting the mapping information corresponding to the active region in the hotness table.

In some implementations, when the number of regions in the hotness table reaches the preset depth of the hotness table, operation S1004 includes determining N regions, which have been accessed by read commands from the host for the largest numbers of times, as the active regions according to numbers of times the regions are accessed by the read command from the host based on the hotness information of the regions in the hotness table. N is a natural number greater than or equal to 1.

In some implementations, after the operation S1005, the method further includes deleting mapping information corresponding to all regions in the hotness table.

Implementations of the present disclosure provide a method of operating a system. The system includes a host and a memory system coupled to the host. The memory system includes a memory device and a controller coupled to the memory device. The method of operating the system includes: by the controller, receiving a read command from a host; accessing a corresponding region of a logical unit of the memory device or a corresponding region of the memory device according to the read command; updating hotness information of the region in a hotness table, wherein the hotness information includes a number of times a region of the memory device is accessed by read commands from the host; determining an active region based on the hotness information of regions in the hotness table; and sending mapping information corresponding to the active region to the host, wherein the mapping information includes a mapping relationship table from logical address to physical address; and receiving, by the host, the mapping information corresponding to the active region.

In some implementations, the host includes a host memory. After the host receives the mapping information corresponding to the active region, the method of operating the system further includes: storing, by the host memory, the mapping information corresponding to the active region; sending, by the host, the read command and the mapping information corresponding to the active region accessed by the read command; receiving, by the controller, the read command, and reading data from the memory device based on the mapping information corresponding to the active region accessed by the read command; and storing, by the memory device, the data corresponding to the read command.

Implementations of the present disclosure provide a readable storage medium that stores a computer program. When the computer program is executed, the method of operating the system in the above technical solution can be implemented.

Implementations of the present disclosure also provide a readable storage medium that stores a computer program. When the computer program is executed, the method of operating the memory system in the above technical solution can be implemented.

In an implementation of the present disclosure, the readable storage medium may include: Random Access Memory (RAM), internal memory, Read-Only Memory (ROM), electrically programmable ROM, electrically erasable programmable ROM, register, hard disk, removable disk, CD-ROM, or any other form of media for program code well known in the technical field.

Implementations of the present disclosure provide a memory system and an operating method thereof, a system and an operating method thereof, and a readable storage medium. The memory system includes a memory device and a controller coupled to the memory device. The controller is configured to: receive a read command from a host; access a corresponding region of a logical unit of the memory device according to the read command and update hotness information of the region in a hotness table, wherein the hotness information includes a number of times the region is accessed by read commands from the host; determine an active region among a plurality of the regions based on the hotness information of regions in the hotness table; and send mapping information corresponding to the active region to the host, wherein the mapping information includes a mapping relationship table from logical address to physical address. In an implementation of the present disclosure, the hotness information of the region in the hotness table is updated according to the region accessed by each execution of the read command from the host. An active region is determined among multiple regions according to the hotness information of the regions in the hotness table, and the mapping information corresponding to the active region is sent to the host. In this way, the hotness information of the regions in the hotness table can be updated in real time, and the mapping information corresponding to the active region can be sent to the host in real time, so that the host can send a read command and obtain the mapping information corresponding to the active region accessed by the read command from the host side, which can improve data reading efficiency.

It should be understood that reference throughout the specification to "one implementation" or "an implementation" means that a feature, structure or characteristic related to the implementation is included in at least one implementation of the present disclosure. Thus, appearances of "in one implementation" or "in an implementation" in various places throughout the specification are not necessarily referring to the same implementation. Furthermore, features, structures or characteristics may be combined in any suitable manner in one or more implementations. It should be understood that in various implementations of the present disclosure, the sequence numbers of the above-mentioned processes do not mean the order of execution, and the execution order of the processes should be determined by their functions and inherent logic, rather than limiting implementation process of the implementations of the present disclosure. The serial numbers of the above-mentioned implementations of the present disclosure are for description only, and do not represent the advantages and disadvantages of the implementations.

The above are only preferred implementations of the present disclosure, and do not limit the patent scope of the present disclosure. Under the inventive concept of the present disclosure, equivalent structural transformations that are made by using the contents of the description and drawings of the present disclosure or direct/indirect applications in other related technical fields are included in the patent protection scope of this disclosure.

What is claimed is:

1. A memory system, comprising:
   a memory device; and
   a controller coupled to the memory device and configured to:
   receive, from a host, a read command;
   access a corresponding region of the memory device according to the read command;
   update hotness information of the corresponding region in a hotness table, wherein the hotness information comprises a number of times a region of the memory device is accessed by read commands from the host;
   determine one or more active regions based on the hotness information of regions in the hotness table;
   send, to the host, mapping information corresponding to the one or more active regions, wherein the mapping information comprises a mapping relationship from logical address to physical address; and
   responsive to sending the mapping information to the host, delete the hotness information corresponding to the one or more active regions from the hotness table.

2. The memory system of claim 1, wherein the controller is configured to:
   in response to the corresponding region accessed by the read command is not in the hotness table, add the corresponding region and the hotness information of the corresponding region accessed by the read command into the hotness table; and
   in response to the corresponding region accessed by the read command is in the hotness table, modify the hotness information of the corresponding region in the hotness table.

3. The memory system of claim 1, wherein a number of times each of the one or more active regions is accessed by read commands from the host is larger than a preset number of times.

4. The memory system of claim 1, wherein the controller is configured to:
in response to a number of regions in the hotness table reaches a preset depth of the hotness table, determine, as N active regions, N regions in descending order of the number of times regions accessed by read commands from the host, according to the hotness information of regions in the hotness table, where N is a natural number greater than or equal to 1.

5. The memory system of claim 4, wherein the controller is further configured to:
delete the hotness information corresponding to all regions in the hotness table.

6. The memory system of claim 1, wherein the one or more active regions refer to one region that has been accessed frequently by read commands from the host recently.

7. The memory system of claim 1, wherein the memory system comprising a solid state drive (SSD) or a universal flash storage (UFS).

8. A system, comprising:
a host configured to send read commands; and
a memory system coupled to the host and comprising:
a memory device; and
a controller coupled to the memory device and configured to:
receive, from the host, a read command;
access a corresponding region of the memory device according to the read command;
update hotness information of the corresponding region in a hotness table, wherein the hotness information comprises a number of times a region of the memory device is accessed by read commands from the host;
determine one or more active regions based on the hotness information of regions in the hotness table;
send, to the host, mapping information corresponding to the one or more active regions, wherein the mapping information comprises a mapping relationship from logical address to physical address; and
responsive to sending the mapping information to the host, delete the hotness information corresponding to the one or more active regions from the hotness table,
wherein the host is configured to receive the mapping information corresponding to the one or more active regions.

9. The system of claim 8, wherein the host comprises a host memory configured to store the mapping information corresponding to the one or more active regions.

10. The system of claim 9, wherein:
the host is further configured to:
obtain, from the host memory, the mapping information corresponding to an active region accessed by another read command; and
send the another read command and the mapping information corresponding to the active region accessed by the another read command; and the controller is further configured to:
receive the another read command and the mapping information corresponding to the active region accessed by the another read command, and
read data from the memory device based on the mapping information corresponding to the active region accessed by the another read command.

11. The system of claim 8, wherein the one or more active regions refer to one region that has been accessed frequently by read commands from the host recently.

12. The system of claim 8, wherein the memory system comprises a solid state drive (SSD) or a universal flash storage (UFS).

13. The system of claim 8, wherein a host performance booster (HPB) or a host memory buffer (HMB) is used to store the mapping information corresponding to the one or more active regions in the host.

14. A method of operating a memory system comprising a memory device and a controller coupled to the memory device, the method comprises:
receiving, from a host, a read command;
accessing a corresponding region of the memory device according to the read command;
updating hotness information of the corresponding region in a hotness table, wherein the hotness information comprises a number of times a region of the memory device is accessed by read commands from the host;
determining one or more active regions based on the hotness information of regions in the hotness table;
sending, to the host, mapping information corresponding to the one or more active regions, wherein the mapping information comprises a mapping relationship from logical address to physical address; and
responsive to sending the mapping information to the host, deleting the hotness information corresponding to the one or more active regions from the hotness table.

15. The method of claim 14, wherein the update of the hotness information of regions in the hotness table comprises:
in response to the corresponding region accessed by the read command is not in the hotness table, add the corresponding region and the hotness information of the corresponding region accessed by the read command into the hotness table; and
in response to the corresponding region accessed by the read command is in the hotness table, modify the hotness information of the corresponding region accessed by the read command in the hotness table.

16. The method of claim 14, wherein the determination of the one or more active regions comprises:
determining one or more regions, which has been accessed by read commands from the host more than a preset number of times, as the one or more active regions based on the hotness information of regions in the hotness table.

17. The method of claim 14, wherein the determination of the one or more active regions comprises:
in response to a number of regions in the hotness table reaches a preset depth of the hotness table,
determining, as N active regions, N regions in descending order of the number of times regions accessed by read commands from the host, according to the hotness information of regions in the hotness table, where N is a natural number greater than or equal to 1.

18. The method claim 17, further comprising:
deleting the hotness information corresponding to all regions in the hotness table after sending the mapping information corresponding to the N active regions to the host.

19. The method of claim 17, further comprising storing the mapping information in a host performance booster (HPB) or a host memory buffer (HMB).

20. The method of claim 17, wherein the memory system comprises a solid state drive (SSD) or a universal flash storage (UFS).

* * * * *